US009889337B2

(12) United States Patent
Palmer

(10) Patent No.: US 9,889,337 B2
(45) Date of Patent: Feb. 13, 2018

(54) FULLY COLLAPSIBLE EXERCISE DEVICE

(71) Applicant: Robin B. Palmer, Agoura Hills, CA (US)

(72) Inventor: Robin B. Palmer, Agoura Hills, CA (US)

(*) Notice: Subject to any disclaimer, the term of this patent is extended or adjusted under 35 U.S.C. 154(b) by 0 days.

(21) Appl. No.: 15/340,044

(22) Filed: Nov. 1, 2016

(65) Prior Publication Data

US 2017/0246503 A1   Aug. 31, 2017

Related U.S. Application Data

(63) Continuation-in-part of application No. 15/055,315, filed on Feb. 26, 2016.

(51) Int. Cl.
| | |
|---|---|
| *A63B 22/06* | (2006.01) |
| *A63B 69/16* | (2006.01) |
| *A63B 21/16* | (2006.01) |
| *B62K 15/00* | (2006.01) |
| *A63B 22/00* | (2006.01) |
| *A63B 21/00* | (2006.01) |

(52) U.S. Cl.
CPC .......... *A63B 22/0694* (2013.01); *A63B 21/16* (2013.01); *A63B 21/1609* (2015.10); *A63B 22/0605* (2013.01); *B62K 15/00* (2013.01); *A47B 2220/06* (2013.01); *A63B 21/00069* (2013.01); *A63B 2022/0097* (2013.01); *A63B 2210/02* (2013.01); *A63B 2210/50* (2013.01)

(58) Field of Classification Search
CPC .............. A63B 21/00069; A63B 21/22; A63B 21/4034; A63B 21/4049; A63B 22/0046; A63B 22/06; A63B 22/0605; A63B 22/0611; A63B 22/0694; A63B 2022/0097; A63B 23/0476; A63B 69/16; A63B 2208/0228; A63B 2208/0233; A63B 2208/0238; A63B 2210/00; A63B 2210/50; A63B 2225/09
See application file for complete search history.

(56) References Cited

U.S. PATENT DOCUMENTS

| | | | | |
|---|---|---|---|---|
| 2,209,034 | A | * | 7/1940 | Paul ..................... A63B 21/023 482/130 |
| D158,675 | S | * | 5/1950 | Longfellow ................ 482/60 |
| 2,668,709 | A | * | 2/1954 | Boyko ............... A63B 22/0007 482/60 |

(Continued)

*Primary Examiner* — Joshua Lee
(74) *Attorney, Agent, or Firm* — Bond Schoeneck and King PLLC; David L. Nocilly

(57) ABSTRACT

An exercise device with a crank housing supporting a pedal crank having a pair of opposing pedals that are pivotally mounted to the pedal crank. A first strut extends from the crank housing and is jointed to a second strut by a coupling that selectively allows the struts to rotate relative to each other so that the device may be folded into a planar configuration or extended for use. A cross-member is positioned at the end of each strut to form legs for supporting the pedal crank in an upright position. A tensioner is associated with the crank housing for selectively increasing and decreasing the force needed to turn the pedal crank. A telescoping arm may be used to interconnect the exercise device to a table or seat so that it can be folded and stored under the table or seat, and unstowed and unfolded for easy use.

8 Claims, 8 Drawing Sheets

(56) References Cited

U.S. PATENT DOCUMENTS

| | | | | |
|---|---|---|---|---|
| 2,673,088 A * | 3/1954 | Wentz | A63B 22/0694 | 482/60 |
| 3,259,385 A * | 7/1966 | Boren | A63B 22/0694 | 248/165 |
| 3,622,153 A * | 11/1971 | Thompson | A63B 22/001 | 482/60 |
| 3,751,033 A * | 8/1973 | Rosenthal | A63B 22/0694 | 482/60 |
| 3,968,963 A * | 7/1976 | Sileo | A63B 22/0605 | 482/137 |
| 4,262,902 A * | 4/1981 | Dranselka | A63B 22/0605 | 482/60 |
| 4,373,716 A * | 2/1983 | Pagani | A63B 21/0004 | 482/130 |
| 4,390,177 A * | 6/1983 | Biran | A63B 21/1609 | 188/83 |
| D281,710 S * | 12/1985 | Kirby | D21/663 | |
| D282,478 S * | 2/1986 | Williams | 482/60 | |
| 4,739,984 A * | 4/1988 | Dranselka | A63B 22/0007 | 482/118 |
| 4,776,583 A * | 10/1988 | Jennings | A63B 24/00 | 482/58 |
| 4,805,901 A * | 2/1989 | Kulick | A63B 22/0605 | 297/118 |
| 4,925,184 A * | 5/1990 | McJunkin, Jr. | A63B 21/1672 | 482/60 |
| 4,971,317 A * | 11/1990 | Link | A63B 22/0694 | 472/128 |
| 5,071,117 A * | 12/1991 | Mautner | A63B 21/00178 | 482/57 |
| 5,470,298 A * | 11/1995 | Curtis | A63B 23/03516 | 482/130 |
| 5,618,247 A * | 4/1997 | Perez | A63B 21/1645 | 482/60 |
| 5,647,822 A * | 7/1997 | Avganim | A63B 22/0007 | 482/57 |
| 5,807,211 A * | 9/1998 | Berryhill | A63B 21/0552 | 482/129 |
| 5,833,575 A * | 11/1998 | Holslag | A63B 21/015 | 482/118 |
| 5,904,638 A * | 5/1999 | Habing | A63B 22/0605 | 482/57 |
| 6,368,260 B1 * | 4/2002 | Crews | A63B 21/0552 | 482/130 |
| 6,979,284 B2 * | 12/2005 | Curtis | A47C 9/002 | 297/217.1 |
| 7,497,812 B2 * | 3/2009 | Neff | A63B 21/008 | 482/51 |
| 7,527,581 B1 * | 5/2009 | Verost | B60N 2/3013 | 482/57 |
| 7,901,331 B1 * | 3/2011 | Stoll | A63B 21/15 | 482/52 |
| D636,826 S * | 4/2011 | Chan | D21/663 | |
| D681,136 S * | 4/2013 | Liu | D21/663 | |
| 8,795,141 B2 * | 8/2014 | Huang | A47C 13/00 | 142/51 |
| 9,162,104 B1 * | 10/2015 | Lee | A63B 22/0694 | |
| 9,284,015 B2 * | 3/2016 | Thompson | B62M 6/45 | |
| 2004/0116257 A1 * | 6/2004 | Balbo | A63B 21/16 | 482/60 |
| 2005/0054492 A1 * | 3/2005 | Neff | A63B 21/008 | 482/57 |
| 2005/0282687 A1 * | 12/2005 | Kazemi | A63B 22/0056 | 482/57 |
| 2007/0117680 A1 * | 5/2007 | Neff | A63B 21/008 | 482/8 |
| 2008/0221492 A1 * | 9/2008 | El'Chonen | A61H 1/0214 | 601/36 |
| 2008/0300113 A1 * | 12/2008 | Battiston | A63B 21/012 | 482/51 |
| 2009/0192024 A1 * | 7/2009 | Wu | A63B 21/015 | 482/57 |
| 2009/0239717 A1 * | 9/2009 | Kim | A63B 21/027 | 482/57 |
| 2013/0237386 A1 * | 9/2013 | Tsai | A63B 21/015 | 482/60 |
| 2016/0016626 A1 * | 1/2016 | Thompson | B62M 6/45 | 701/22 |
| 2016/0016636 A1 * | 1/2016 | Thompson | B62M 6/45 | 74/594.7 |

* cited by examiner

FULLY COLLAPSIBLE EXERCISE DEVICE

BACKGROUND OF THE INVENTION

1. Field of the Invention

The present invention relates to exercise equipment and, more particularly, to a lower body exercise device that is configurable between a collapsed configuration for easy transport and stowage and an extended yet compact configuration for use.

2. Description of the Related Art

More than 300 million people travel on long-distance flights (more than four hours) each year. Blood clots, also called deep vein thrombosis, can be a serious risk for long-distance travelers. Indeed, deep vein thrombosis kills someone every five minutes and responsible for more deaths than AIDS, breast cancer, prostate cancer and traffic accidents combined. During travel, blood clots can form in the deep (not visible) veins of the legs of a passenger. The longer the period of immobility, the greater the risk of developing a blood clot. Doctors thus recommend that passengers move their legs when on long trips improve the flow of blood. However, it is not always possible to move around during a flight due to turbulence and blockage of the aisles by passengers and crew, such as when carts are used for beverage and food service. Accordingly, there is a need in the art for an exercise device that is compact enough for transportation and use on an airplane so that passengers can avoid deep vein thrombosis.

BRIEF SUMMARY OF THE INVENTION

The present invention is a compact exercise device that can be unfolded from a collapsed configuration for use in a small area, such as the floor in front of an airline seat, so that a user can perform exercises that reduce the likelihood of deep vein thrombosis. The exercise device comprises a crank housing supporting a pedal crank having a pair of opposing pedals that are pivotally mounted to the pedal crank. A pair of struts extends from the crank housing and one of the struts has a hinge that allows the leg to fold inward into a collapsed configuration against the opposing leg. A lock may be associated with the hinge for retaining the leg in the unfolded position. A cross-member is positioned at the end of each strut to form legs for supporting the pedal crank in an upright position for use by an operator. A strap may be coupled to one of the pair of legs for additionally securing the exercise device to an airline seat. A tensioner associated with the crank housing is connected to the pedal crank for selectively increasing and decreasing the force needed to turn the pedal crank so that a user can adjust the amount of force needed to operate the pedal crank. A telescoping arm may also be used to easily stow the exercise device under a desk, table, chair, seat, or other article of furniture,

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
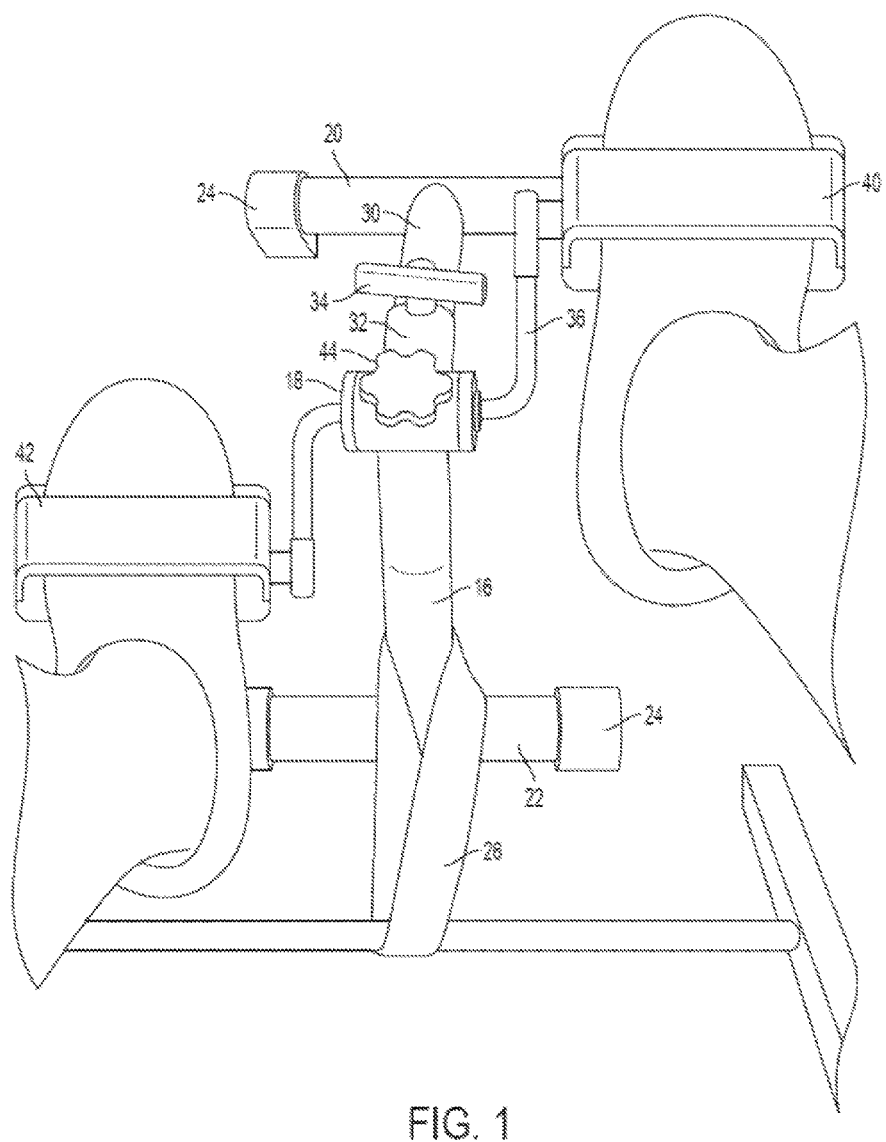
FIG. 1 is a top plan of an exercise device according to the present invention in an unfolded configuration.

Referring now to the drawings, wherein like reference numerals refer to like parts throughout, there is seen in FIG. 1 an exerciser 10 comprising a base 12 formed from two opposing struts 14 and 16 that are interconnected to each other by an axle housing 18 and extend outwardly. Outward ends of struts 14 and 16 include cross-members 20 and 22 that define two pairs of legs for secure engagement with a planar surface, such as a floor. The ends of the legs formed by cross-members 20 and 22 may be capped with resilient caps 24 to increase frictional contact with the planar surface upon which exercise device is placed. Struts 14 and 16 as well as cross-members 20 and 22 are preferably tubular to maximize strength while minimizing weight, and may be manufactured from high strength polymers or light weight metals and metal alloys for the same reason. A strap 26 may be coupled to base 12 to allow exercise 10 to be attached to an external structure, such as an airplane seat, to restrict movement of exercise device 10 when in use.

Figure 2:
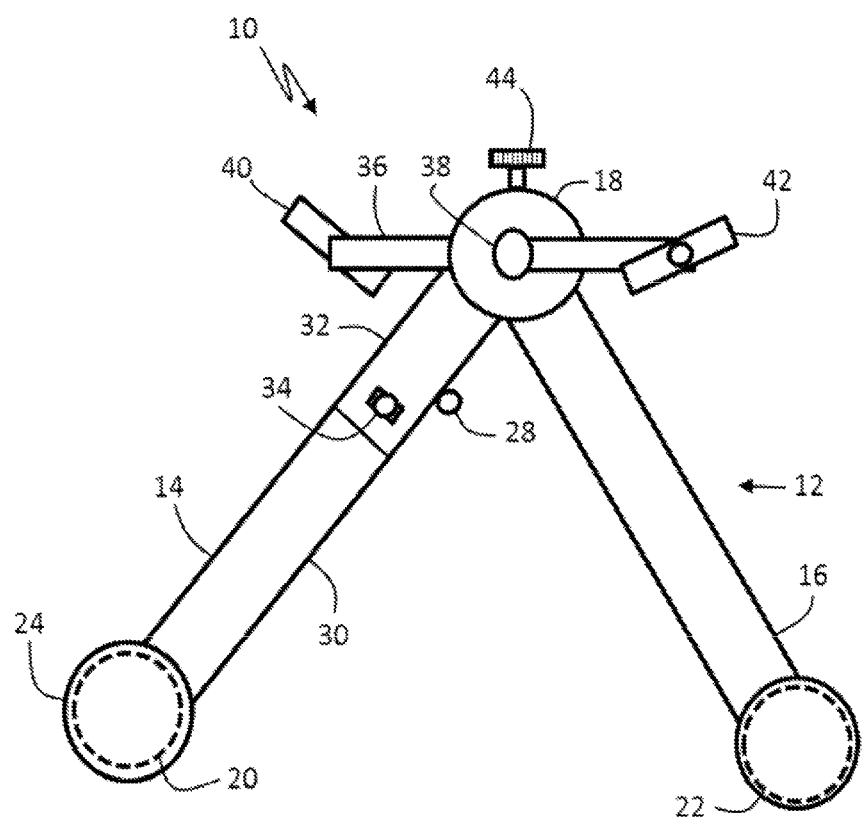
FIG. 2 is a side view of an exercise device according to the present invention in an unfolded configuration.
Figure 3:
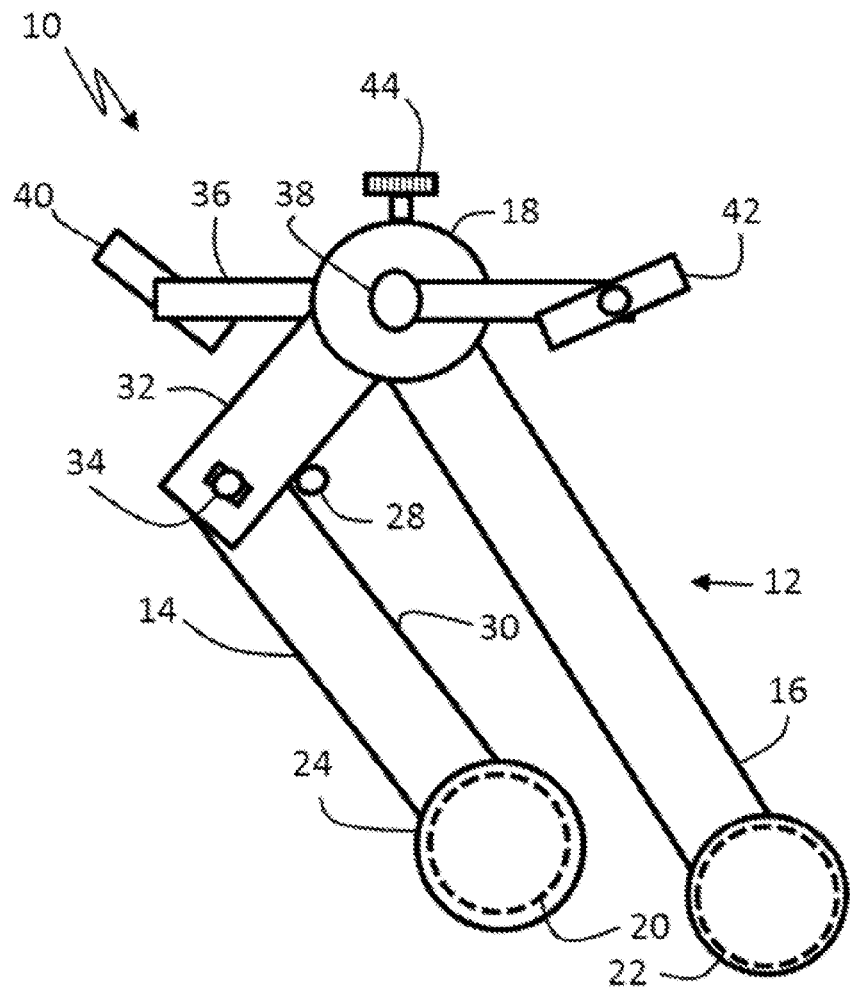
FIG. 3 is another side view of view of an exercise device according to the present invention in a folded configuration.

Strut 14 includes a hinge 28 dividing strut 14 into first and second segments 30 and 32. As seen in FIGS. 2 and 3, hinge 28 allows segments 30 and 32 to move between a first, collapsed configuration and a second, extended configuration. Hinge 28 further includes a locking member 34 that may be engaged and disengaged to selectively lock and unlock segments 30 and 32 in their extended configuration and, optionally, the collapsed configurations.

Axle housing 18 supports a pedal crank 36 having an axle 38 extending through axle housing 18 to position user pedals 40 and 42 on opposite sides of axle housing 18. As is known in the art, pedal crank 36 may be supported in axle housing 18 by a sealed bearing or similar structure for smooth rotation within axle housing 18. A tensioner 44 may be coupled to axle housing 18 to allow a user to change the amount of force needed to turn pedal crank 36. User pedals 40 and 42 are pivotally mounted to pedal crank 36 for movement between a folded position where pedals 40 and 42 are centrally stowed, and an unfolded position where pedals 40 and 42 are positioned so that a user can place their feet on pedals 40 and 42 to operate pedal crank 36 when exercise device 10 is placed on the floor in front of user, such as on the floor of an airplane in front of a passenger seat.

In one embodiment, exercise device 10 may be dimensioned so that it is 10 inches in width, 9.5 inches in height, and 15 inches in length and thus will fit within the standard floor space in the coach section of an airplane (approximately 17 inches in length and width). Collapsing strut 14 and folding pedals 40 and 42 inwardly will reduce the dimensions to just 5 inches in width, 12 inches in height, and 15 inches in length. As a result, exercise device 10 can be easily carried on and/or stored on an airplane in the collapsed configuration, and then unfolded and placed on the floor of the airplane for use. Using tensioner 44, a user may establish a comfortable amount of resistance and proceed to perform exercises that will increase blood flow and reduce the risk of thrombosis without having to leave the passenger seat. After exercise, device 10 may be collapsed and stowed.

Figure 4:
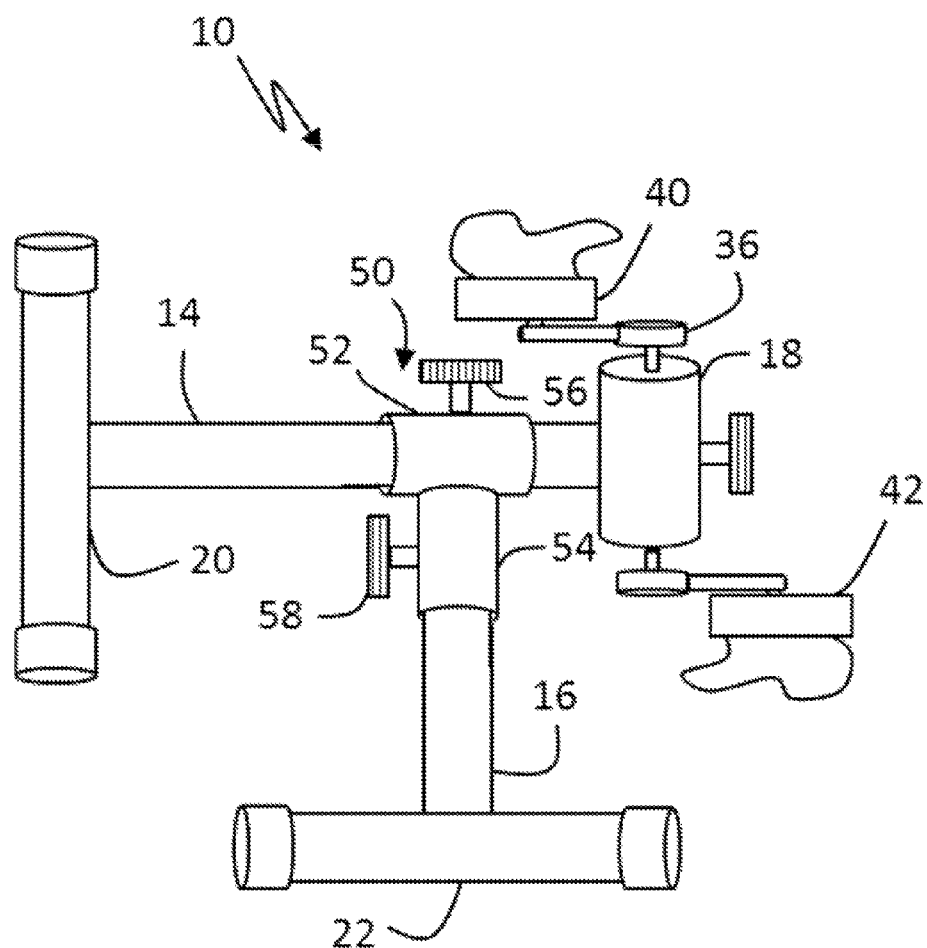
FIG. 4 is a top plan of an exercise device according to the present invention in a folded flat configuration.

Referring to FIG. 4, hinge 28 of exercise device 10 may be substituted with a coupling 50 that allows for rotation of struts 14 and 16 relative to each other so that device 10 may be positioned into a substantially planar configuration. More specifically, coupling 50 comprises two strut engaging tubes 52 and 54 positioned at right angles to each other. Each of tubes 52 and 54 have manually adjustable clamps 56 and 58 associated therewith for selectively fixing and releasing struts 14 and 16 therein. As seen in FIG. 4, releasing struts 14 and 16 allows rotation of struts 14 and 16 relative to each other so that device 10 may be folded flat into a substantially planar configuration. It should be recognized that this configuration may allow for each storage or transportation of device 10 in certain locations where a planar configuration is more advantageous, e.g., in a briefcase, under a seat, etc.

Figure 5:
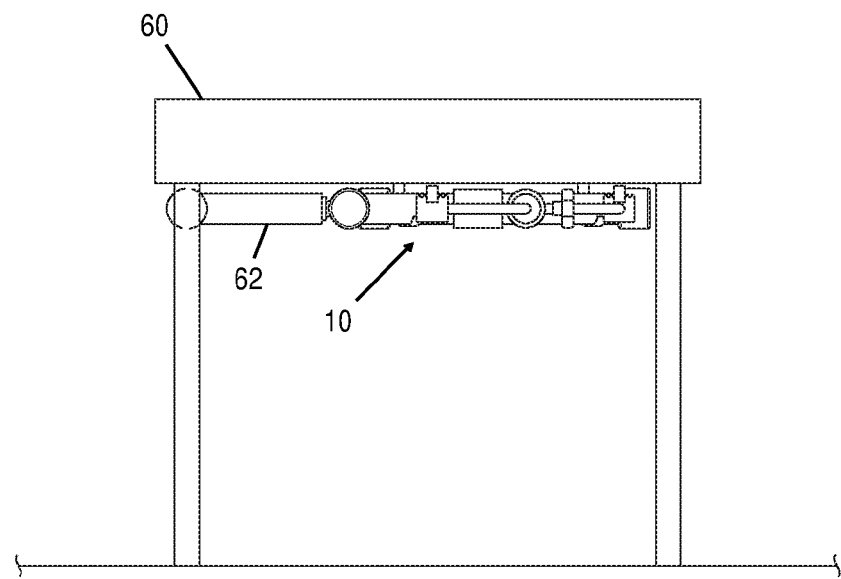
FIG. 5 is a side view of an exercise device mounted under a desk and in a stored position according to the present invention.
Figure 6:
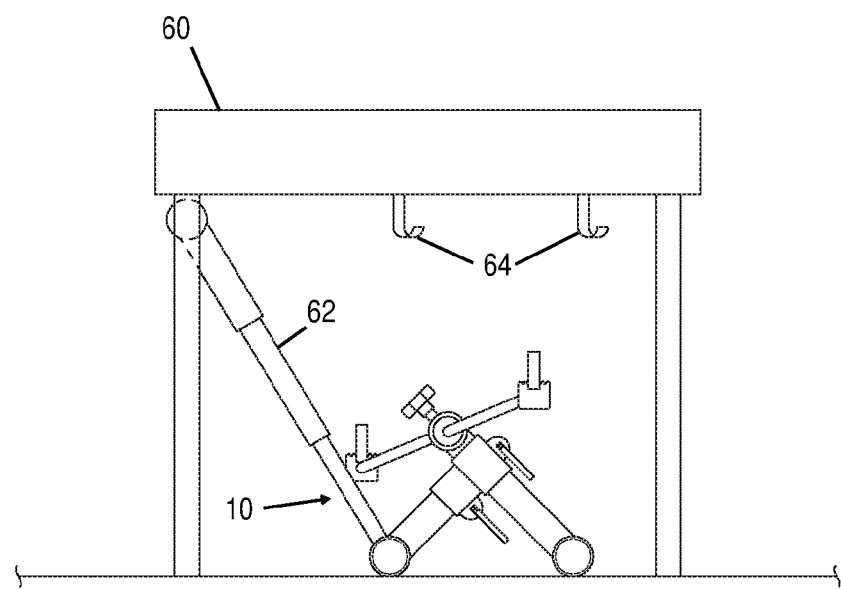
FIG. 6 is a side view of an exercise device mounted under a desk and in an extended position according to the present invention.
Figure 7:
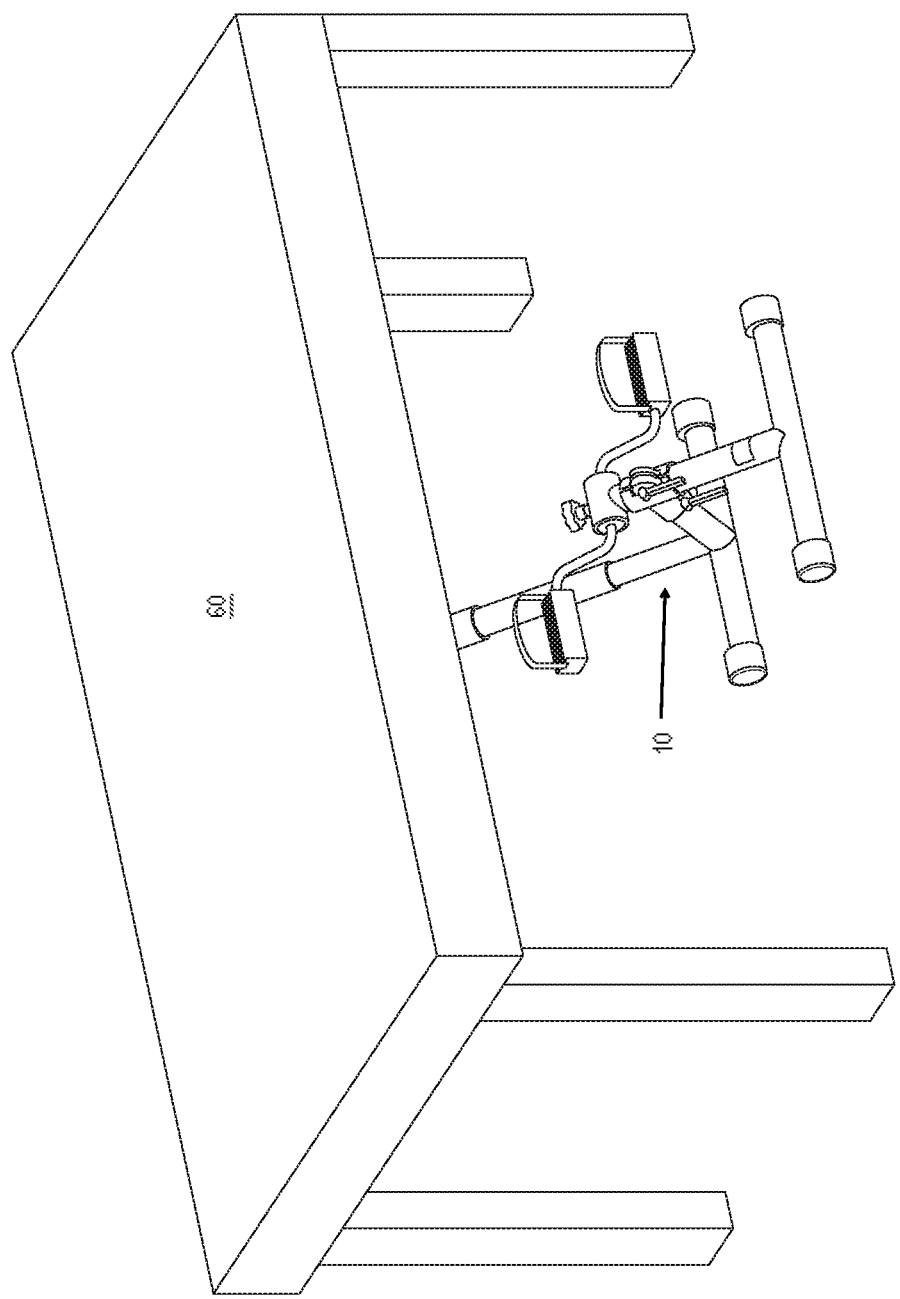
FIG. 7 is a perspective view of an exercise device mounted under a desk and in an extended position according to the present invention.
Figure 8:
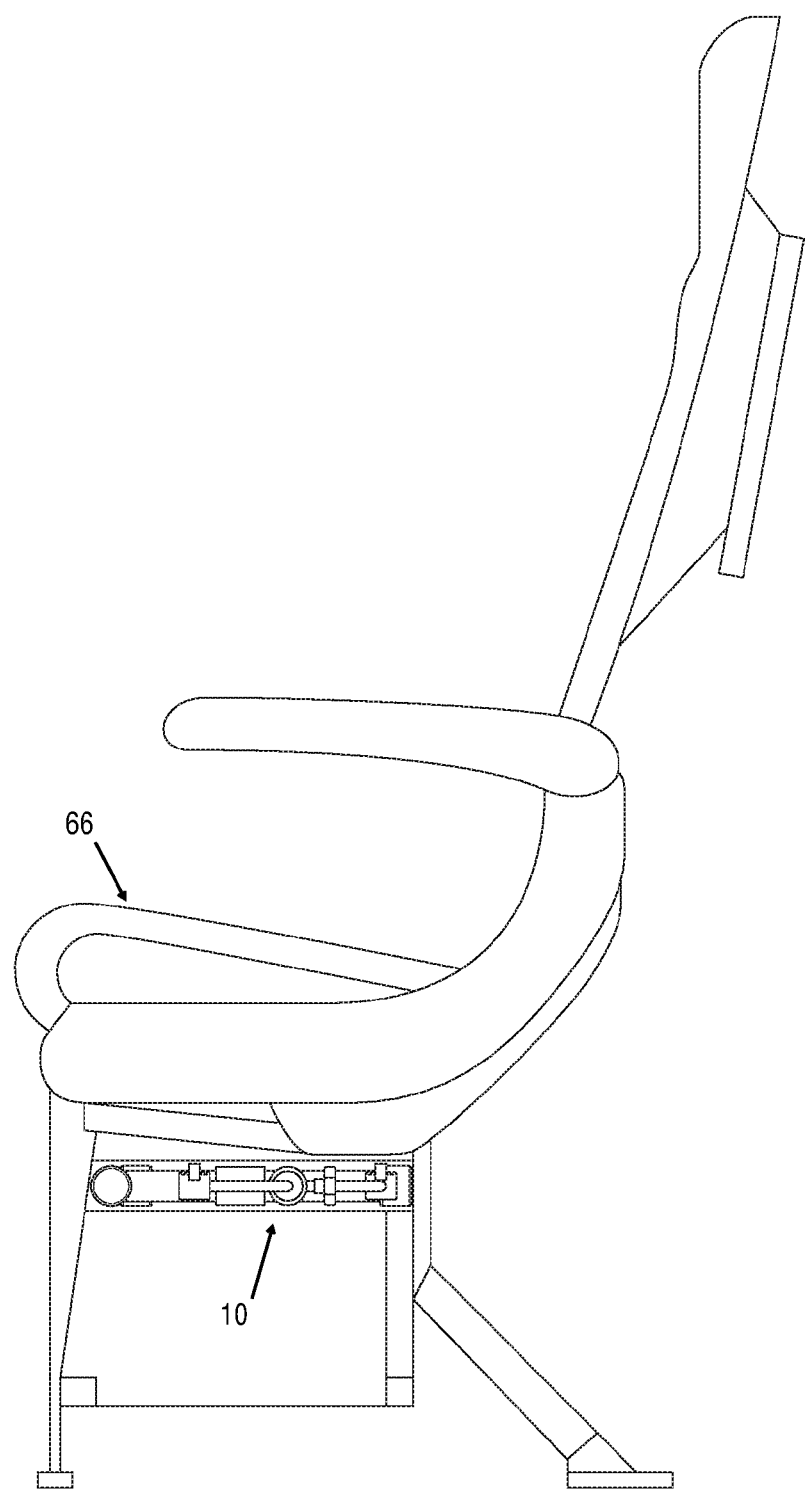
FIG. 8 is a side view of an exercise device mounted under a seat and in a stored position according to the present invention.
Figure 9:
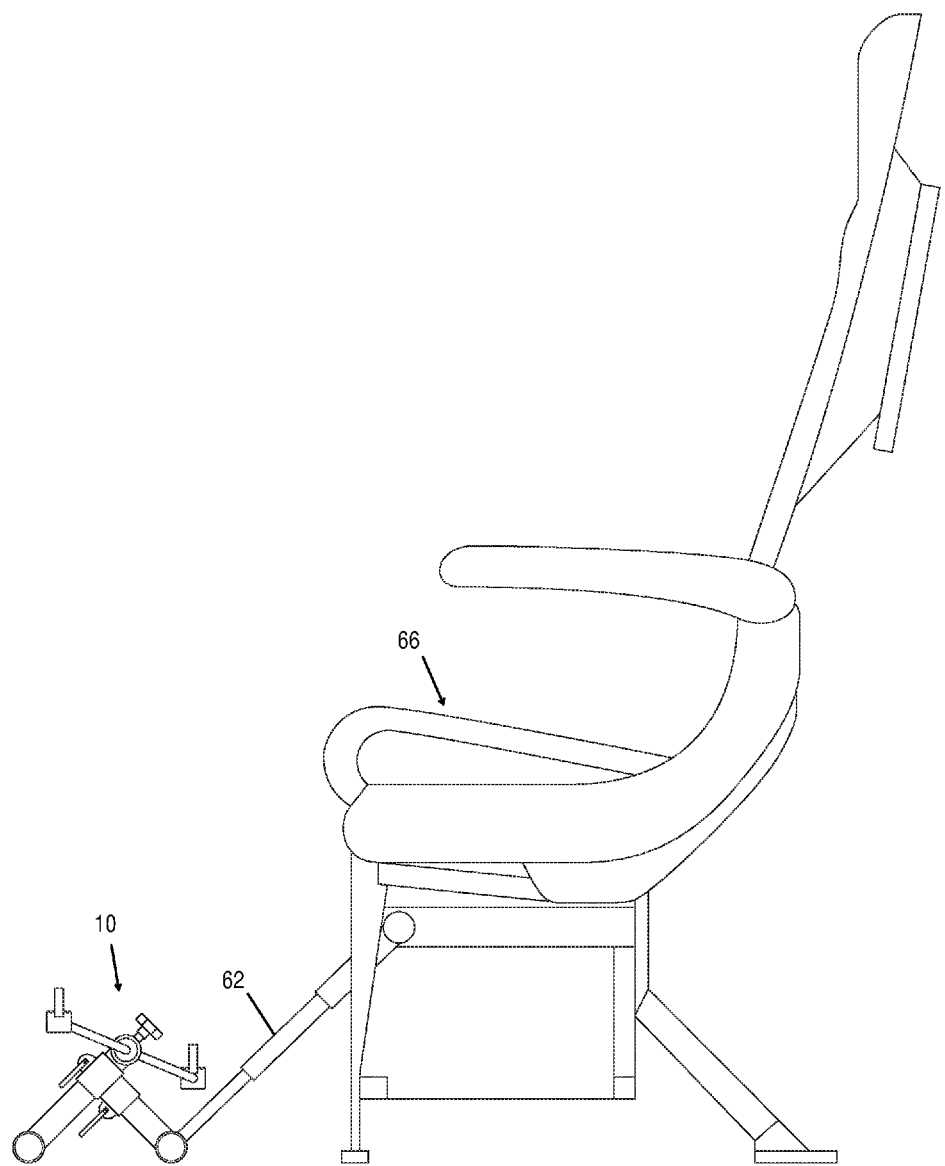
FIG. 9 is a side view of an exercise device mounted under a seat and in an extended position according to the present invention.

Referring to FIGS. 5 through 7, exercise device 10 may be configured to be stored under a desk or table 60 when in the folded, planar configuration, and then extended from table 60 and unfolded for use. Exercise device 10 is mounted to table 60 via a telescoping arm 62 that is pivotally attached at one end to table 60 and at the other end, for example, to one of cross-members 20 or 22. One or more hooks 64 may be used to secure device 10 in place under table 60. As seen in FIG. 7, when unstowed and unfolded, exercise device 10 may be used by a person seated at table 60. Referring to FIGS. 8 and 9, exercise device 10 may be similarly interconnected via telescoping arm 62 under a seat 66, whether a chair, airplane seat, lounge etc. for storage when in a folded configuration and use in the unstowed and unfolded configuration. It should be recognized by those of skill in the art that device 10 could be interconnected to table 60 or seat 66 via similar structures, whether telescoping or not, and with or without pivoting, swiveling, etc.

What is claimed is:

1. An exercise device, comprising:
   a crank housing supporting a pedal crank having a pair of opposing pedals that are pivotally mounted to the pedal crank for movement between a folded position where the pair of pedals are centrally stowed, and an unfolded position where the pedals may be operated to drive the pedal crank;
   a first strut extending from the crank housing;
   a second strut interconnected to the first strut by a coupling that allows rotation of both of the first and second struts within the coupling and relative to each other so that the device may be folded into a planar configuration;
   a pair of members positioned at ends of the first and second struts, respectively, to define a pair of legs for supporting the crank housing in an upright position; and
   an arm interconnected at a first end to one of the pair of members.

2. The device of claim 1, wherein the arm is connected at a second end to a table.

3. The device of claim 1, wherein the arm is connected at a second end to a desk.

4. The device of claim 1, wherein the arm is connected at a second end to a chair.

5. The device of claim 1, wherein the arm is connected at a second end to an airplane seat.

6. The device of claim 1, wherein the arm is telescopic.

7. The device of claim 6, wherein the arm is pivotally mounted to one of the pair of members.

8. The device of claim 7, where a second end of the arm is pivotally mounted to an article of furniture.

* * * * *